(12) United States Patent
Wiersma et al.

(10) Patent No.: US 9,222,615 B2
(45) Date of Patent: Dec. 29, 2015

(54) CLIP-IN SUPPORT RING

(71) Applicant: Sensata Technologies, Inc., Attleboro, MA (US)

(72) Inventors: Hedzer Dedde Wiersma, Deventer (NL); Ernie Shoot Uiterkamp, Heeten (NL); Andrew LeGendre, Dedham, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 14/469,985

(22) Filed: Aug. 27, 2014

(65) Prior Publication Data

US 2015/0069199 A1 Mar. 12, 2015

Related U.S. Application Data

(60) Provisional application No. 61/874,605, filed on Sep. 6, 2013.

(51) Int. Cl.
*A47F 5/00* (2006.01)
*A47F 1/08* (2006.01)
*F16M 13/02* (2006.01)
*B23K 15/00* (2006.01)
*G01D 11/24* (2006.01)
*G01L 1/22* (2006.01)
*B23K 1/00* (2006.01)

(52) U.S. Cl.
CPC .............. *F16M 13/02* (2013.01); *B23K 1/0008* (2013.01); *B23K 15/008* (2013.01); *G01D 11/245* (2013.01); *G01L 1/2287* (2013.01)

(58) Field of Classification Search
CPC ...... G01S 15/931; G01S 15/04; F16M 13/02; B23K 15/008; B23K 1/0008; G01D 11/245; G01L 1/2287
See application file for complete search history.

(56) References Cited

U.S. PATENT DOCUMENTS

| 4,614,997 | A | | 9/1986 | Montet |
| 5,280,861 | A | * | 1/1994 | Corriveau ................ 242/586 |
| 6,203,366 | B1 | * | 3/2001 | Muller et al. ............ 439/561 |
| 6,282,969 | B1 | * | 9/2001 | Daniel ..................... 73/866.1 |
| 2002/0096618 | A1 | | 7/2002 | Pitault et al. |
| 2003/0019983 | A1 | * | 1/2003 | Iinuma et al. ............ 248/200 |
| 2006/0254375 | A1 | | 11/2006 | Shoji |
| 2007/0131520 | A1 | * | 6/2007 | Saunders et al. ......... 198/502.1 |

FOREIGN PATENT DOCUMENTS

| EP | 0 833 132 A2 | 4/1998 |
| WO | WO 2006 122616 A1 | 11/2006 |

OTHER PUBLICATIONS

Extended European Search Report, EP 14 18 3465, Feb. 2, 2015, European Patent Office.

* cited by examiner

*Primary Examiner* — Amy Sterling
(74) *Attorney, Agent, or Firm* — Chapin IP Law, LLC

(57) ABSTRACT

In an embodiment, a support ring may include an arm and a hook. The arm may be located at a first end of the support ring. The arm may provide a spring force to a circuit board that is loaded in the support ring. The hook may be located at a second end of the support ring. The hook may extend upward from the support ring. The second end may be opposite the first end. The hook may provide a reaction force on the circuit board. The reaction forced may be a force in reaction to the spring force. The support ring may include one or more legs. The legs may extend downward from the support ring.

12 Claims, 5 Drawing Sheets

CLIP-IN SUPPORT RING

RELATED APPLICATIONS

This application claims priority to and the benefit of U.S. Provisional Patent Application No. 61/874,605, filed on Sep. 6, 2013 and titled "Clip-in Support Ring", the contents of which are incorporated by reference as though fully set forth herein.

BRIEF DESCRIPTION OF DRAWINGS

The accompanying drawings, which are incorporated in and constitute a part of this specification, illustrate one or more embodiments described herein and, together with the description, explain these embodiments. In the drawings.

DETAILED DESCRIPTION

A sensor device such as, for example, a micro-strain gauge (MSG) device, may have an electronic module assembly (EMA). The EMA may be mechanically fixed above a diaphragm in the sensor device for wire-bonding. The EMA may be connected electrically to a housing associated with the sensor device for electromagnetic compatibility (EMC) performance.

Clip-in support rings described herein may be used to provide these functions in a device such as, for example, a sensor device. The clip-in support rings may, for example, provide fixation of the EMA by way of a spring force and a reaction force. Moreover, affixing (e.g., spot welding) a clip-in support ring described herein to a housing of the device may, for example, provide a robust mechanical and/or electrical connection to the housing. The electrical connection may provide electrical continuity between the EMA and the housing.

Figure 1:
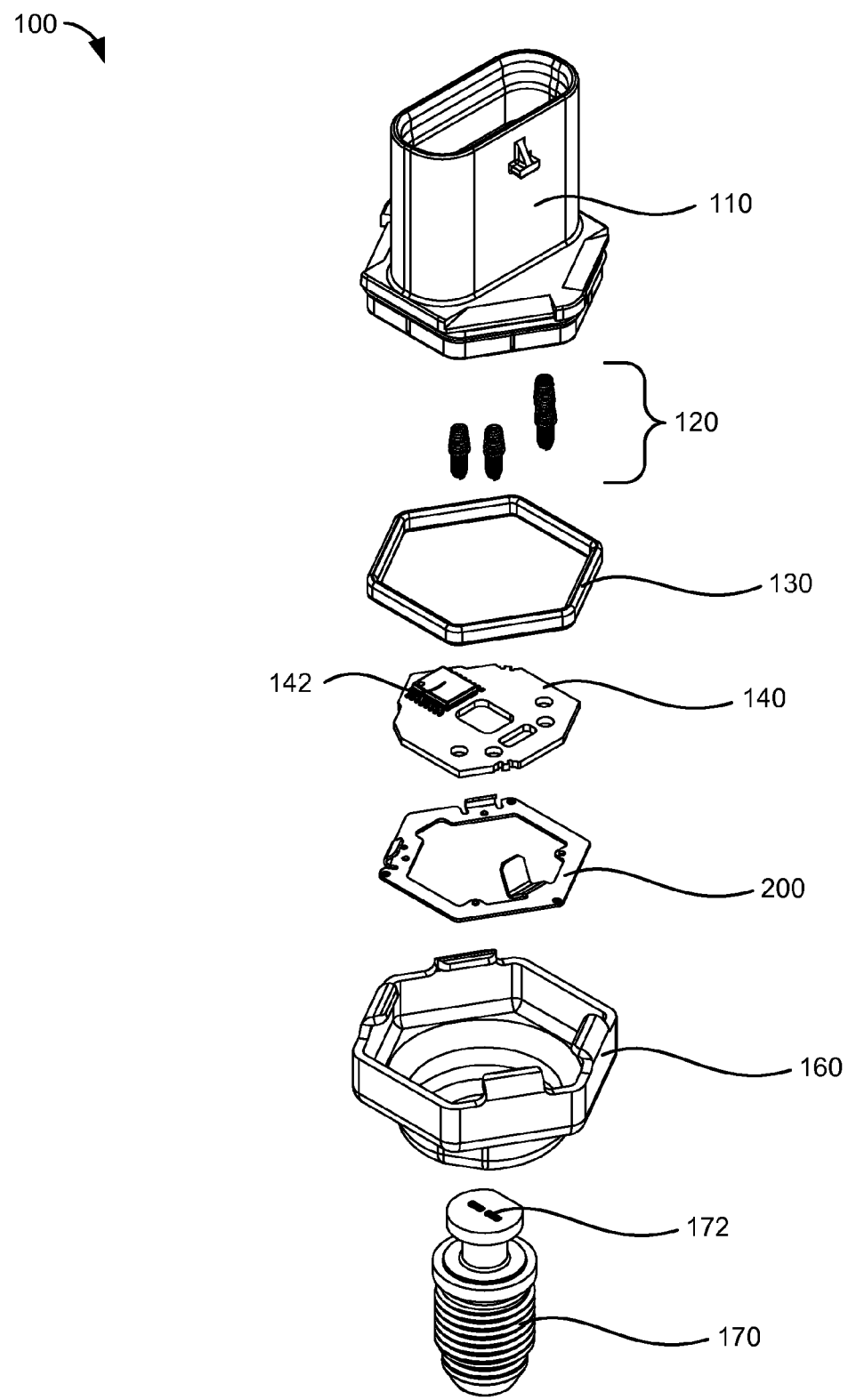
FIG. 1 illustrates an example embodiment of a sensor device having an electronics module assembly (EMA) and a clip-in support ring.

FIG. 1 illustrates an example embodiment of a sensor device 100 having an EMA 140 and a clip-in support ring 200. Referring to FIG. 1, sensor device 100 may include, for example, a connector 110, one or more contact springs 120, an environmental seal 130, EMA 140, clip-in support ring 200, a housing 160, and a sense element assembly 170.

The connector 110 may connect the sensor device 100 with an external source (e.g., an external computer). Connector 110 may include a terminal that may make, for example, electrical contact with an electrical conductor (e.g., an electrical wire) that may be connected to the external source. The terminal may, for example, be used to transfer signals that may be produced by the sensor device 100 to the external source via the electrical conductor. The signals may include, for example, sensor readings that may be made by the sensor device 100.

Contact springs 120 may provide electrical continuity between EMA 140 and, for example, a terminal contained in connector 110. Contact springs 120 may include an electrically conductive material (e.g., silver plating) that may be used to provide the electrical continuity.

Environmental seal 130 may provide a seal between, for example, connector 110 and housing 160. Environmental seal 130 may prevent, for example, contaminants (e.g., moisture, dirt), that may potentially affect a performance of the sensor device 100, from entering the sensor device 100.

EMA 140 may include, for example, a circuit board and one or more electronic components 142 (e.g., integrated circuits, transistors, resistors, capacitors, inductors, diodes). The circuit board may be a printed circuit board (PCB). The electronic components may be mounted on the circuit board. The electronic components may, for example, process conditions (e.g., forces) sensed by sense element assembly 170 and/or generate signals based on the sensed conditions. The electronic components may include components that may transfer the generated signals to an external source via a terminal that may be contained in connector 110.

Housing 160 may provide a mounting platform for the clip-in support ring 200. Housing 160 may be made of a metal that may enable clip-in support ring 200 to be affixed (e.g., welded) to the housing 160. In an embodiment, housing 160 is shaped as a hexagonal cup.

Sense element assembly 170 may include provisions for sensing conditions such as, for example, conditions applied to the sensor device 100. Sense element assembly 170 may include for example, strain gauges 172 that may be used to sense various forces that may be applied to the sensor device 100.

Conditions sensed by sense element assembly 170 may be detected by circuitry contained on EMA 140. The circuitry may process the sensed conditions and generate various signals based on the processed sensed conditions. The signals may be transferred from the sensor device 100 to an external source via a terminal contained in connector 110.

Clip-in support ring 200 may be a support ring that may secure EMA 140 in sensor device 100. Specifically, EMA 140 may be loaded onto clip-in support ring 200. Afterwards, clip-in support ring 200 may be affixed to housing 160, thereby, providing a secure support for EMA 140 in sensor device 100.

Figure 2:
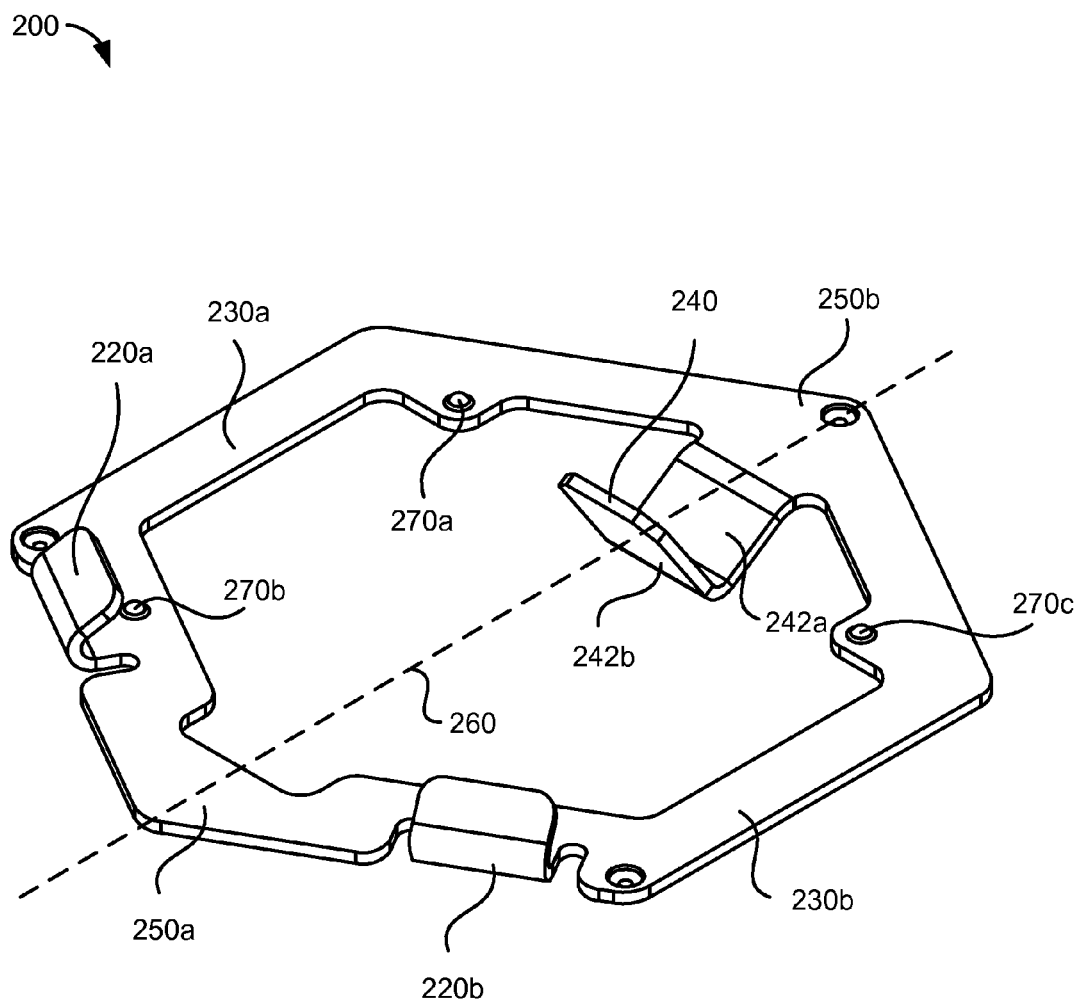
FIG. 2 illustrates an example embodiment of a clip-in support ring that may be contained in the sensor device illustrated in FIG. 1.

FIG. 2 illustrates an example embodiment of clip-in support ring 200. Referring to FIG. 2, clip-in support ring 200 may include, for example, hooks 220a-b, beams 230a-b, an arm 240, a first end 250a, a second end 250b, and pedestals 270a-c. Plane 260 may illustrate a primary plane of the clip-in support ring 200.

It should be noted that clip-in support ring 200 may include other features. For example, clip-in support ring 200 may include one or more legs. The legs may extend (e.g., protrude) downward from clip-in support ring 200. The legs may, for example, support clip-in support ring 200 when the clip-in support ring 200 is affixed to housing 160. The legs may make contact with housing 160 and provide electrical continuity between EMA 140 (after being loaded in clip-in support ring 200) and housing 160. Examples of legs that may be used with clip-in support ring 200 will be described further below. Hooks 220a-b may extend upward from clip-in support ring 200 at the first end 250a. Hooks 220a-b may provide a force to EMA 140 that in combination with a force provided by arm 240 may hold EMA 140 in place in the clip-in support ring 200. As will be described further below, the force provided by hooks 220a-b may be, for example, a reaction force that may be applied to EMA 140 in response to a spring force that may be applied to EMA 140 by arm 240.

It should be noted that while two hooks 220a-b are illustrated in FIG. 2, other embodiments of clip-in support ring 200 may include other numbers of hooks 220. For example, in other embodiments, clip-in support ring 200 may include one hook 220 or more than two hooks 220.

Beams 230a-b may be in plane 260 and located between the first end 250a and the second end 250b. Beams 230a-b may have widths that are smaller than widths of the first end 250a and/or the second end 250b. Beams 230a-b may be compliant (e.g., flexible) and may provide a reaction force to EMA 140 after the EMA 140 is loaded in clip-in support ring 200. A flexibility of beams 230a-b may, however, be restricted (e.g., locked out) after, for example, the clip-in support ring 200 is loaded with EMA 140 and the clip-in support ring 200 is affixed to housing 160.

Arm 240 may be located at the second end 250b. Arm 240 may include a first portion 242a and a second portion 242b. The first portion 242a may extend downwards from plane 260. The second portion 242b may extend upwards from an end of the first portion 242a and cross plane 260 to extend upward above plane 260. In an embodiment, the first portion 242a and second portion 242b may be shaped to form a "V". It should be noted, however, that in other embodiments, the first portion 242a and the second portion 242b may be shaped to form other shapes (e.g., a semi-circle). Arm 240 may be compliant and may provide a spring force that may act as a clamping force for holding EMA 140 in place after the EMA 140 is loaded in the clip-in support ring 200.

It should be noted that while one arm 240 is illustrated in FIG. 2, other embodiments of clip-in support ring 200 may include other numbers of arms 240. For example, other embodiments of clip-in support ring 200 may include multiple arms 240. Moreover, arms 240 in other embodiments of clip-in support ring 200 may be shaped differently than illustrated in FIG. 2.

Pedestals 270a-b may provide, for example, support for EMA 140 after EMA 140 is loaded in clip-in support ring 200. Moreover, pedestals 270a-b may be provide electrical continuity between EMA 140 and clip-in support ring 200.

As will be described further below, clip-in support ring 200 may be affixed to housing 160. Affixing clip-in support ring 200 to housing 160 may provide electrical continuity between EMA 140 and housing 160 via clip-in support ring 200. The electrical continuity may be provided, for example, via pedestals (e.g., pedestals 270a-b) and/or legs that may be contained on clip-in support ring 200.

Figure 3:
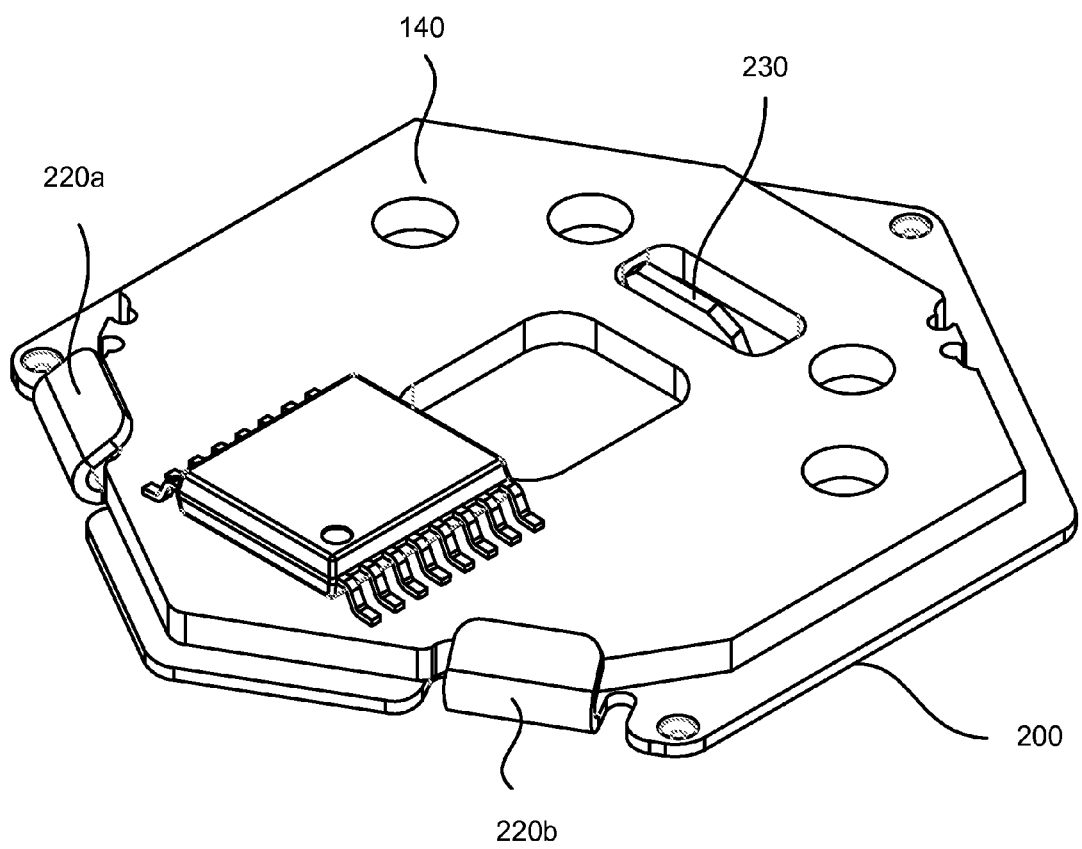
FIGS. 3 illustrates an example placement of an EMA in the clip-in support ring.
Figure 4:
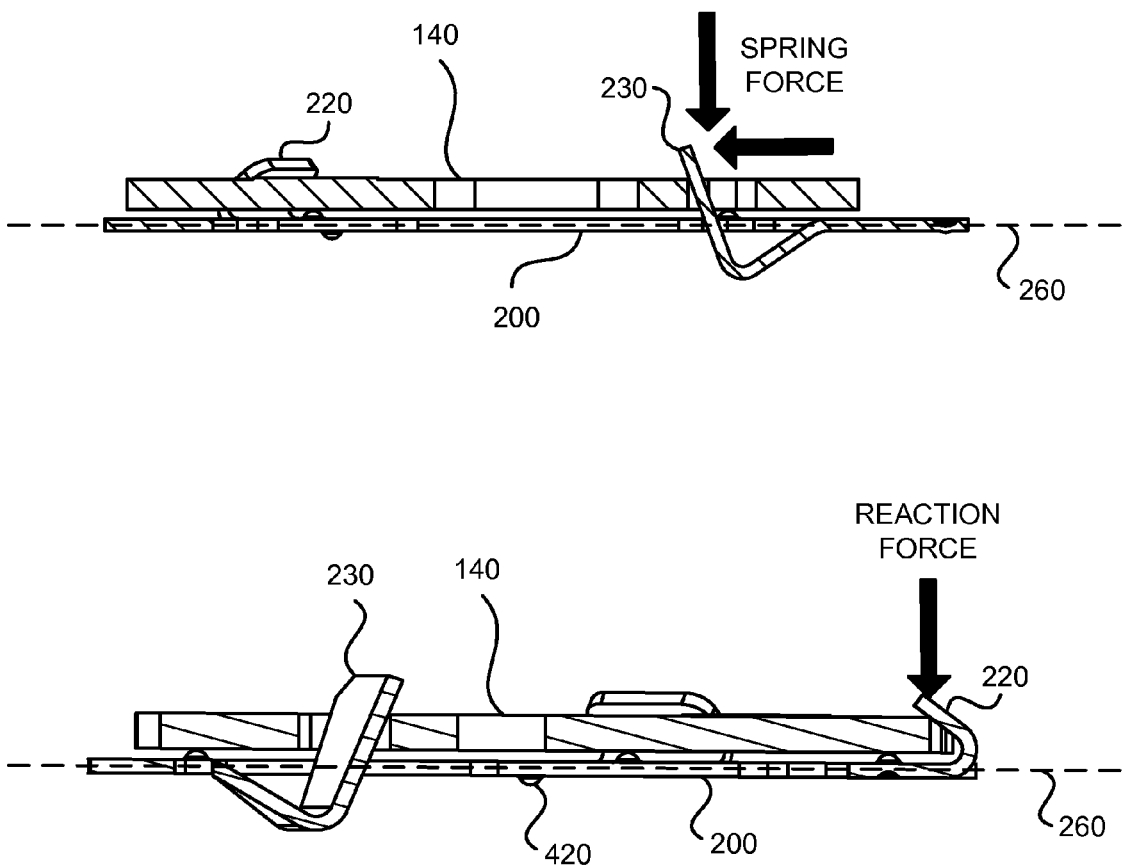
FIG. 4 illustrates an example operation of the clip-in support ring.

FIG. 3 illustrates an example placement of EMA 140 in clip-in support ring 200 and FIG. 4 illustrates an operation of clip-in support ring 200. Referring to FIG. 3, a first end of EMA 140 may, for example, include an opening to accommodate arm 240. A second end of EMA 140 may, for example, be notched to accommodate hooks 220a-b.

In operation, arm 240 and hooks 220a-b may provide one or more forces that may be used to secure EMA 140 to clip-in support ring 200. Referring now to FIG. 4, arm 240 may provide a spring force on the first end of the EMA 140. The spring force may include one or more forces. For example, in an embodiment, the spring force may include a force in a lateral direction with respect to plane 260 and/or a force in a downward direction with respect to plane 260.

In an embodiment, the spring force may be achieved by two compliant features of the clip-in support ring 200 in series. Here, for example, a first feature may include the compliant beams 230a-b and a second feature in series with the first feature may include the stiffer formed yet compliant arm 240.

Hooks 220a-b may provide a reaction force on a second end of the EMA 140 opposite the first end of the EMA 140. The reaction force may be in reaction to the spring force provided by the arm 240. A combination of the spring and reaction forces may secure the EMA 140 in the clip-in support ring 200.

Loading EMA 140 in clip-in support ring 200 may be achieved, for example, by bending (e.g., bending in) plane 260 of the clip-in support ring 200, which may be facilitated by beams 230a-b. A sub-assembly process may include a fixture that may first bend the clip-in support ring 200 along the beams 230a-b and then actuate or rotate arm 240 to obtain the situation of FIG. 3.

As noted above, clip-in support ring 200 may include one or more legs. An example of legs that may be used with clip-in support ring 200 include legs 420. Legs 420 may be shaped, for example, as dimples that may extend downward from clip-in support ring 200. The dimples may make contact with housing 160 after clip-in support ring 200 is placed in housing 160.

It should be noted that the legs 420 illustrated in FIG. 4 are an example of a type of leg that may be used with clip-in support ring 200. Other embodiments of clip-in support ring 200 may include other types of legs. For example, an embodiment of clip-in support ring 200 may include one or more prongs that may perform the function of legs 420.

After loading EMA 140 in the clip-in support ring 200 the clip-in support ring 200 may be affixed (e.g., spot welded) to housing 160. Affixing the clip-in support ring 200 to housing 160 may obviate bending of the beam 230a-b and may result in a retention force that may keep the EMA 140 in place over an expected life of the sensor device 100.

Figure 5:
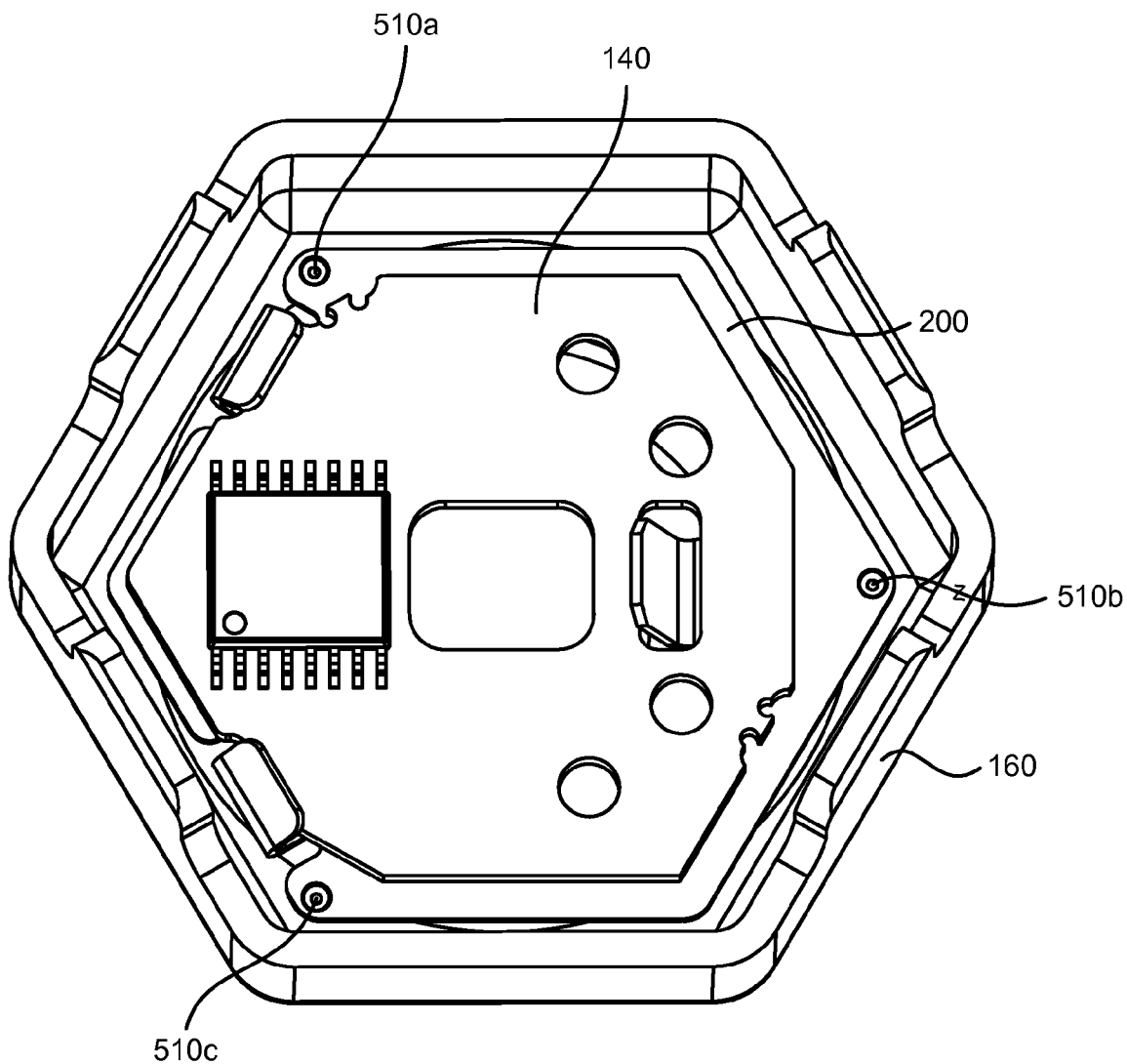
FIG. 5 illustrates an example technique for securing the clip-in support ring to a housing that may be contained in the sensor device illustrated in FIG. 1.

FIG. 5 illustrates an example technique for affixing the clip-in support ring 200 to housing 160 after the clip-in support ring 200 is loaded with EMA 140. Referring to FIG. 5, the clip-in support ring 200 may be secured to the housing 160 by spot welding the clip-in support ring 200 to the housing 160 at various points 510a-c. Note that points 510a-c are examples of points where clip-in support ring 200 may be spot welded to housing 160. In other embodiments, clip-in support ring 200 may be secured to housing 160 at other points on the clip-in support ring 200. Moreover, it should be noted that in other embodiments, clip-in support ring 200 may be secured to housing 160 using techniques other than spot welding.

The foregoing description of embodiments is intended to provide illustration and description but is not intended to be exhaustive or to limit the invention to the precise form disclosed. Modifications and variations are possible in light of the above teachings or may be acquired from practice of the invention.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A support ring comprising:
   an arm at a first end of the support ring, the arm providing a spring force to an electronic module assembly (EMA) that is loaded in the support ring, the arm including:
      a first portion that extends downwards from a primary plane of the support ring, and
      a second portion extends upwards crossing the primary plane of the support ring; and a hook at a second end of the support ring, the second end being opposite the first end, the hook providing a reaction force to the EMA that is in reaction to the spring force.

2. The support ring of claim 1, further comprising:
a first beam; and
a second beam,
wherein the first beam and the second beam are in a primary plane of the support ring and are located between the first end and the second end.

3. The support ring of claim 2, wherein the first beam and the second beam are compliant.

4. The support ring of claim 1, wherein the spring force provided by the arm includes a force in a lateral direction with respect to a primary plane of the support ring.

5. The support ring of claim 1, wherein the spring force provided by the arm includes a force in a downward direction with respect to a primary plane of the support ring.

6. The support ring of claim 1, wherein the hook extends upward from the support ring.

7. The support ring of claim 1, further comprising:
a leg that extends downward from the support ring.

8. The support ring of claim 7, wherein the leg is a dimple.

9. The support ring of claim 1, wherein the support ring is affixed to a housing of a sensor device.

10. The support ring of claim 9, wherein the affixed support ring provides electrical continuity between the housing and the EMA.

11. The support ring of claim 9, wherein the sensor device includes a micro-strain gauge (MSG).

12. The support ring of claim 9, wherein the support ring is affixed to the housing by a spot weld.

* * * * *